United States Patent [19]

Schnee et al.

[11] Patent Number: 4,640,954
[45] Date of Patent: Feb. 3, 1987

[54] POLYMER SUSPENSION CONTAINING A WATER-SOLUBLE POLYMER SUSPENDED IN AN OIL PHASE

[75] Inventors: Reiner Schnee, Darmstadt-Arheilgen; Horst Pennewiss, Darmstadt-Neu-Kranichstein; Gerhard Markert, Ober-Ramstadt, all of Fed. Rep. of Germany

[73] Assignee: Röhm GmbH, Darmstadt, Fed. Rep. of Germany

[21] Appl. No.: 697,287

[22] Filed: Feb. 1, 1985

Related U.S. Application Data

[63] Continuation-in-part of Ser. No. 476,050, Mar. 17, 1983, abandoned.

[30] Foreign Application Priority Data

Mar. 24, 1982 [DE] Fed. Rep. of Germany ....... 3210752

[51] Int. Cl.$^4$ ............................................. C08L 39/00
[52] U.S. Cl. .................................... 524/516; 524/458; 524/460; 524/521; 524/523; 526/201; 526/203
[58] Field of Search ............... 524/516, 521, 523, 458, 524/460; 526/201, 203

[56] References Cited

U.S. PATENT DOCUMENTS

| | | | |
|---|---|---|---|
| 2,979,491 | 4/1961 | Piloni | 526/201 |
| 3,218,302 | 11/1965 | Melamed | 526/201 |
| 3,436,385 | 4/1969 | Mathieu | 526/201 |
| 3,948,866 | 4/1976 | Pennewiss et al. | 526/219 |
| 3,979,349 | 9/1976 | Fink et al. | 524/135 |

FOREIGN PATENT DOCUMENTS

| | | |
|---|---|---|
| 6135501 | 10/1981 | Japan ................ 526/201 |
| 1440168 | 6/1976 | United Kingdom . |
| 1482515 | 8/1977 | United Kingdom . |
| 2027045A | 2/1980 | United Kingdom . |

OTHER PUBLICATIONS

Fundamental Principles of Polymerization, "Copolymer Compositions and Stability of Polymers", D'Alelio, 1952, pp. 413 and 414.

*Primary Examiner*—Joseph L. Schofer
*Assistant Examiner*—J. M. Reddick
*Attorney, Agent, or Firm*—Curtis, Morris & Safford

[57] ABSTRACT

A suspension of an aqueous solution of a water-soluble polymer in an organic liquid forming a continuous organic phase, said suspension containing, as an emulsifier, a mixture of two copolymers which are similar but differ in their content of basic nitrogen by 0.1 to 1.5 percentage points.

11 Claims, No Drawings

POLYMER SUSPENSION CONTAINING A WATER-SOLUBLE POLYMER SUSPENDED IN AN OIL PHASE

This application is a continuation-in-part application of pending application Ser. No. 476,050 filed Mar. 17, 1983, and now abandoned.

The present invention relates to polymer suspensions containing a water soluble polymer, or a polymer dissolved in water, finely dispersed in an organic phase, and to methods for making the same. (Such suspensions are also known as water-in-oil (W/O) emulsions or organosols, especially when they contain water.) More particularly, the invention relates to polymer suspensions of this type which can be dissolved directly in water to give a dilute aqueous solution of the water soluble polymer.

It is known from U.S. Pat. No. 3,691,124 to add a copolymeric emulsifying agent to W/O emulsions of water soluble polymers. Such an emulsifying agent is a copolymer of a monomer having basic nitrogen atoms and, as comonomers, long chain esters of acrylic acid or of methacrylic acid. The dissolution of such suspensions in water is time consuming.

Similar polymer suspensions which additionally contain a water soluble acid are known from German patent publication No. 24 12 266. So long as the suspension contains a continuous oil phase, the copolymer added as an emulsifying agent acts as a W/O emulsifier. On being stirred into water, the agent reacts with the water soluble acid to become an oil-in-water (O/W) emulsifier which then brings about emulsification of what was the continuous oil phase and permits the rapid liberation and dissolution of the water soluble polymer. Although the rate of the dissolution of the suspension in water is considerably increased by the addition of an acid, further acceleration of the dissolving process is desirable.

The object of the present invention, thus, is to provide suspensions of the type mentioned which will reverse, and dissolve, more rapidly in water. This object is accomplished with polymer suspensions of the type described wherein two macromolecular emulsifying agents soluble in the organic phase are present, both comprising (A) from 10 to 50 percent by weight of monomers having a basic nitrogen atom and (B) from 90 to 50 percent by weight of monomers having an alkyl side chain at least 6 carbon atoms long, or a mixture of such monomers with other water insoluble monomers. The two agents are prepared from monomer mixtures in which the weight percentage content of basic nitrogen atoms in component (A) in each case is from 1.5 to 4.0 percent by weight, but wherein the nitrogen content in the two agents differs by 0.1 to 1.5 percentage points. In preferred embodiments, the basic nitrogen content of component (A) of each copolymer in the binary emulsifying agent is from 1.8 to 3.5 percent by weight, or from 2.0 to 3.2 percent by weight. In these cases also, a difference in nitrogen content between 0.1 and 1.5 percentage points is also maintained.

Surprisingly, the use of such an emulsifier mixture results in an accelerated dissolution of the suepension in water in the presence of a water soluble acid. This is all the more surprising because it is known that the polymerization of a mixture of different monomers does not result in the formation of polymer molecules in which the incorporated monomeric units are present in the same ratio as are the monomers in the original monomer mixture. Rather, there will always be portions of polymer which contain more of a given monomer component than does the starting mixture, along with other polymer portions which contain less of that component than does the mixture. This factor, which is due to the different polymerization rates of the monomers involved, is known as chemical distribution. During the preparation of the macromolecular emulsifier mixtures used in accordance with the invention from two different monomer mixtures, polymer molecules may therefore form which have the same differences in monomer composition which, because of said chemical distribution, could also form if a homogeneous monomer mixture corresponding to the average composition of the emulsifier mixture were polymerized. Nevertheless, the polymeric emulsifiers produced from two different monomer mixtures exhibit a behavior which differs from that of a copolymer produced from a homogeneous monomer mixture. It is postulated that this difference is due to a different distribution of the parts of the polymer molecules having different nitrogen contents. However, it is not intended that the invention be tied to this interpretation.

The suspensions in accordance with the invention may contain water soluble polymers of a cationic, anionic, ampholytic, or nonionic nature. The amount of the oil phase may range from 15 to 60 weight percent, for example, and preferably is from 25 to 50 weight percent. Following preparation, the polymer phase contains as much water as was used to dissolve the water soluble polymer or the original monomer mixture. The water content frequently ranges from 15 to 30 weight percent, based on the weight of the polymer phase. The water content may be removed completely or partially by azeotropic dehydration. The polymer phase forms liquid droplets or gel-like or solid particles having a diameter from about 1 to 10 microns. Depending on the amount of the polymer phase, the suspensions range from highly fluid to viscous or paste-like, the viscosity being preferably in the range from 600 to 2,000 mPas. The molecular weight of the water soluble polymer may be as high as several million. One percent aqueous solutions of the polymers will have viscosities ranging from 500 to 10,000 mPas, for example.

The new polymer suspensions are used mainly to prepare dilute aqueous solutions of the water soluble polymer. Such solutions with polymer contents ranging from about 0.01 to 50 weight percent have a great many uses, for example as thickeners, flocculation and sedimentation aids, retention agents in papermaking, dyeing assistants, hair setting lotions, etc.

The invention offers the advantage of making it possible to achieve both high stability and a high dissolution rate in water in the presence of an acid, whereas prior art processes only permit obtaining either high stability or a high dissolution rate. A readily soluble but not very stable prior art suspension is contrasted below with a suspension in accordance with the present invention.

Both suspensions contained a mixture of three parts of a mineral oil and one part of the macromolecular emulsifier as the oil phase. The emulsifier in both cases consisted of 26 weight percent of monomeric units of dimethylaminoethyl methacrylate and 74 percent of units of long chain methacrylic acid esters. In the case of the first suspension, the emulsifier had been prepared from a monomer mixture of the same composition. The second suspension contained a 7:3 mixture of two polymeric emulsifiers. The first of these had been prepared from a monomer mixture containing 24 weight percent of dimethylaminoethyl methacrylate, in addition to long chain methacrylic esters. The second emulsifier had been prepared by the polymerization of a monomer mixture containing 30 weight percent of dimethylaminoethyl methacrylate, in addition to long chain methacrylic esters. The difference in the basic nitrogen content of the two monomer mixtures forming the two polymers of the emulsifier mixture was 0.6 percentage point. Equal amounts of an aqueous monomer solution of acrylamide and methacryloxyethyl trimethylammonium chloride were emulsified in the two oil phases and polymerized.

In addition to extremely fine emulsified polymer particles, the suspension which in accordance with the prior art had been prepared with a homogeneous polymeric emulsifier contained a considerable amount of coarse polymer beads. These were not stably suspended but tended to settle, to agglutinate, and to clog valves.

In contrast thereto, the suspension prepared in accordance with the invention from a mixture of two polymeric emulsifiers was stable, homogeneous, and very finely divided, and on being stirred into water in the presence of adipic acid passed into solution completely within 1.5 hours.

The new suspensions may be prepared by emulsifying an aqueous polymer solution in the oil phase containing the macromolecular emulsifier. Preferably, however, an aqueous solution of the ingredients going into the water soluble polymer is emulsified in the oil phase and reacted in the suspension to give the polymer. The acid required to dissolve the suspension in water may be added to the solvent water but is preferably contained in the suspension itself. It is highly preferable already to add the acid to the mixture of polymer components; however, it may also be added later, during or after the preparation of the suspension.

If desired, the amount of water which gets into the suspension with the aqueous solution of the polymer or its components may be eliminated either completely or partially. This can conveniently be done by preparing the oil phase at least in part from an organic liquid which forms an azeotrope with water. The water content of the suspension can then be removed from it by azeotropic distillation.

The organic liquid which together with the macromolecular emulsifier forms the oil phase of the suspension can be any organic liquid which is not fully miscible with water and with the aqueous polymer solution or with the aqueous solution of the ingredients going into the polymer. When the water soluble polymer is produced by polymerization in the suspension, the organic liquid must not boil below the polymerization temperature, must not be fully miscible with the aqueous phase at that temperature, and must not impede the formation of the water soluble polymer. Aliphatic hydrocarbons such as gasoline, kerosene, paraffin oil or mineral oils, aromatic hydrocarbons such as benzene, toluene, or xylene, and esters or chlorinated hydrocarbons, are suitable for use, for example. Liquids which will have a pronounced chain transfer effect during the free radical polymerization, as, for example, carbon tetrachloride, are less suitable if very high molecular weight water soluble polymers are to be produced in the suspension by free radical polymerization.

The activity of the macromolecular emulsifier and the action of the water soluble acid on the basic nitrogen atoms is described in German patent publication No. 24 12 266. The statements made there essentially apply also to the emulsifier mixture used in accordance with the present invention.

Ethylenically mono-unsaturated free radically polymerizable vinyl monomers having basic nitrogen atoms include basic N-vinyl heterocyclic compounds such as vinylpyridine and vinylimidazole, and dialkylaminoalkyl esters and amides of acrylic acid and of methacrylic acid, preferably wherein the alkyl groups are lower alkyl, for example dimethylaminoethyl-acrylate or -methacrylate and diethylaminopropyl-acrylamide or -methacrylamide.

Esters of ethylenically mono-unsaturated polymerizable mono- and di-carboxylic acid esters formed with alcohols, preferably alkanols, having 6-20 carbon atoms are used as the hydrophobic component of the macromolecular emulsifier. The acrylic, methacrylic, maleic, and fumaric acid esters of alkanols containing 6 or more carbon atoms, such as hexanol, octanol, and octadecanol, or of technical alcohol mixtures such as those sold under the trademark "Lorol", for example, are preferred. In addition to such esters, less hydrophobic water insoluble comonomers such as styrene and lower esters of acrylic or methacrylic acid, preferably lower alkyl esters, may, in small amounts, also go into the composition of the emulsifier. The quantitative ratio between the monomers having basic nitrogen atoms and the monomers having higher alkyl groups is such that the hydrophilic/lipophilic balance (HLB) of the copolymer in the non-neutralized state is less than 6, and preferably less than 5, and after reaction of the basic nitrogen atoms with the water-soluble acid, is greater than 8, and more particularly in the range from 10 to 15. This will be the case when the amount of monomers having basic nitrogen atoms ranges from 10 to 50 weight percent, and more particularly from 20 to 30 weight percent, of the total weight of the copolymer.

The suspensions in accordance with the invention normally contain a macromolecular emulsifier consisting of a mixture of two copolymers made from monomer mixtures differing with respect to basic nitrogen content of the component (A) by from 0.1 to 1.5 weight percentage points. The content of monomers with basic nitrogen atoms and the difference in nitrogen content between the two monomer mixtures going into the copolymers is based on the weight of the entire monomer mixture. When the monomer mixtures going into the copolymer differ with respect to nitrogen content by less than 0.1 percentage point, the advantages of the invention will not come into play. When they differ by more than 1.5 percentage points, the suspension is likely to break up and be unstable. The two copolymers may be used in a ratio ranging from about 1:10 to 10:1, and preferably from 7:3 to 3:7, parts by weight. The copolymer having the lower content of monomeric units with a basic nitrogen atom preferably predominates.

It is advisable, though not absolutely necessary, that the copolymers making up the emulsifier as a whole be composed of the same monomeric units.

The copolymers are best produced by free radical solution polymerization in the organic liquid which forms the organic phase of the suspension. The solution polymers may be prepared individually and then mixed. Preferably, both copolymers are produced in the same batch. For example, polymerization may be started with a monomer mixture having the lower nitrogen content and, after partial reaction, a further amount of the nitrogen containing monomer may be added and polymerization continued.

The molecular weight of the macromolecular emulsifier should be greater than 10,000, but the viscosity of the organic phase should not exceed 20,000 mPas. The amount of emulsifier dissolved in the organic phase affects the particle size of the aqueous polymer phase. Particles in the desired size range from about 1 to 10 microns will be obtained with emulsifier contents ranging from 10 to 50 weight percent, based on the weight of the organic phase. If larger particles are desired, the amount of the emulsifier may be reduced to about 2 weight percent. Sufficiently stable suspensions are generally not obtained below that limit.

In the preparation of the suspension, the water soluble polymer may be present in a concentration of about 10 to 90 weight percent, based on the weight of the aqueous polymer phase. The water content of the polymer phase is preferably between 10 to 50 weight percent, which can be secured by using appropriately concentrated aqueous polymer solutions or appropriately concentrated solutions of the components forming the polymer or by azeotropic dehydration of a suspension which originally contained more water. Complete water removal is also possible.

The water soluble polymer may be of a cationic, anionic, ampholytic, or nonionic nature. Nonionic monomeric units, even of monomers which are not water soluble, may also go into the composition of the ionic polymers. The water soluble polymers may be natural substances, for example, alginates, pectins, or gelatins, or derivatives of natural substances, for example carboxymethylcellulose. Preferably they are water soluble vinyl polymers of an anionic, cationic, ampholytic, or nonionic nature. They may be prepared by any of the known polymerization methods and emulsified in the form of an aqueous solution in the oil phase. Preferably, however, an aqueous solution of the components forming the polymer is emulsified and converted to a polymer as an emulsion. As a rule, the ingredients forming the polymer are a water soluble vinyl monomer or mixture of vinyl monomers susceptible to free radical polymerization and a suitable polymerization initiator, and these are then exposed in emulsified form to polymerization initiating conditions.

The vinyl monomers or mixtures of vinyl monomers used as polymer components must, overall, be water soluble to the extent that an at least 10 percent aqueous solution can be prepared therefrom at the polymerization temperature. When a mixture of different monomers is used, it will suffice if the mixture as a whole has this solubility; individual monomer components may be sparingly soluble or even insoluble in water.

The monomers may be of an anionic, cationic, or nonionic nature. Mixtures of these monomer types, and especially mixtures of anionic and nonionic monomers or of cationic and nonionic monomers, may be used. Mixtures of cationic and anionic, and optionally nonionic monomers, too, are in many cases compatible, as taught in German patent publication No. 28 32 944, for example.

Examples of anionic monomers are alpha, beta-unsaturated mono- and di-carboxylic acids such as acrylic, methacrylic, itaconic, maleic, or fumaric acid, and water soluble salts thereof, in particular alkali metal and ammonium salts, as well as vinylsulfonic acid, acrylaminoalkane sulfonic acids, or phenylvinyl phosphonic acids, and their salts.

Examples of cationic monomers are vinylpyridine, vinylimidazole, vinylimidazoline, vinylimidazolidine, aminoalkyl esters and aminoalkyl amides of the unsaturated polymerizable carboxylic acids, such as the 2-dimethylaminoethyl, 2-dimethylaminopropyl, 4-dimethylaminobutyl, 3-dimethylaminoneopentyl, dimethylaminoethyl, morpholinoethyl, and piperidinoethyl esters of acrylic or methacrylic acids, dimethylaminopropyl-acrylamide or -methacrylamide, as well as the salts and quaternization products of these compounds. Tertiary aminoalkyl esters and amides of acrylic acid and methacrylic acid, particularly dialkylaminoalkyl esters and amides, and more particularly diloweralkylamino-loweralkyl esters and amides are preferred monomers as are their corresponding quaternization products, particularly the trialkylammoniumalkyl esters and amides and, more particularly, the triloweralkylammonium-loweralkyl compounds.

Examples of nonionic monomers which are at least partially water soluble are acrylamide and methacrylamide, vinylpyrrolidone, and the hydroxyalkyl esters of acrylic or methacrylic acid, and in particular the 2-hydroxyethyl and 2-hydroxypropyl esters thereof.

Preferred monomers or mixtures of monomers are acrylamide or methacrylamide and the dialkylaminoalkyl esters and amides of acrylic acid or of methacrylic acid, and their salts or quaternization products. Mixtures of these two monomer types in a weight ratio ranging from 95:5 to 5:95 and especially from 95:20 to 5:80 are particularly preferred.

For the conversion of said polymer components into a water soluble polymer, an initiator or initiator system which is dissolved completely or partially in the organic phase may be used. Preferably, however, the polymerization initiator is dissolved in the aqueous phase together with the other polymer components.

When the conversion of the polymer components to the polymer is carried out by means of high energy radiation, and in particular ultraviolet radiation, it is advisable to use a photoinitiator such as benzoin, benzoin ethers, acyloins and their ethers, benzophenones, anthraquinones, anthraquinone carboxylic acids, etc. When the polymerization is to be effected by heattng, for example to temperatures ranging from 50° to 100° C., thermally decomposing initiators may be used, for example alkali metal or ammonium persulfates or azo compounds such as azobisvaleric acid or azobisisobutyronitrile. Redox initiation systems, for example, tert-butylperpivalate in combination with a reducing component such as sodium pyrosulfite, are suitable for use at lower polymerization temperatures. In this case, a component of the initiator system, and in particular the peroxidic component, may be dissolved in the oil phase.

The initiators are employed in the usual amounts from 0.01 to 1 weight percent, based on the weight of the monomers. Photopolymerization may be initiated with UV radiation at or even below room temperature. A source of radiation in the wavelength range from 150 to 500 nanometers (nm), and more particularly from 200 to 400 nm, will be required, which may be a mercury arc, xenon, tungsten, or carbon arc lamp, or preferably fluorescent tubes. For the thermal initiation of polymerization, the emulsion is heated in the polymerization zone to the temperature of decomposition of the initiator, which usually is in the 40° to 80° C. range. After polymerization has started, the heat of polymerization is removed by cooling.

The acid which is needed to transform the suspension into an aqueous solution may be dispersed in the solvent water, but is preferably incorporated into the suspension itself. For example, the acid may be stirred in after the suspension has been prepared or after the starting components have been converted to the water soluble polymer. It has been found that it does not matter whether the acid is in the organic phase or in the aqueous phase. In either case, it becomes effective only when the suspension is dissolved in water. Preferably, however, the acid is dissolved together with the water soluble polymer or its components in the aqueous phase before it is emulsified in the oil phase. Water soluble acids are preferred.

The acid added may be practically any inorganic or organic acid which is soluble in at least one phase of the suspension, for example, a hydrohalic acid, sulfuric acid, phosphoric acid, para-toluenesulfonic acid, diphenylphosphinic acid, acetic acid, or chloroacetic acid, as well as acidic salts, for example, ammonium hydrogen sulfate, etc. Of these acids, the inorganic acids produce a thickening effect which may be desirable because it can improve the storage stability of the polymer suspension. Organic acids generally produce a lesser viscosity increase, if any. Suitable organic acids are, in particular, those having not more than 10 carbon atoms, such as formic acid, acetic acid, propionic acid, isobutyric acid, chloroacetic acid, glycolic acid, acrylic acid, methacrylic acid, adipic acid, maleic acid and fumaric acid, organic sulfonic acids such as benzenesulfonic acids or para-toluene-sulfonic acid, as well as organic phosphonic and phosphinic acids, for example diphenylphosphinic acid.

The amount of the acid must be sufficient to assure rapid dissolution of the polymer suspension in water. This will be the case when a sufficiently large number of the basic nitrogen atoms of the macromolecular emulsifier is converted to the salt form by reaction with the water soluble acid. In many cases it will suffice if at least half of the basic nitrogen atoms are converted to the salt form. The acid therefore is preferably present in an amount that is at least about half-equivalent to the basic nitrogen atoms. Preferably, however, more than an equivalent amount of acid is used. In many cases the addition of a water soluble acid can be dispensed with if the water soluble polymer itself contains acid groups.

A better understanding of the present invention and of its many advantages will be had by referring to the following specific examples, given by way of illustration.

EXAMPLE 1

An oil phase and an aqueous monomer phase were emulsified in a 2-liter beaker with a high speed agitator (about 17,000 rpm) for from 2 to 3 minutes.
Oil phase:
151.6 g of mineral oil;
42.0 g of a polymeric emulsifier consisting of a copolymer prepared from 24 percent by weight of dimethylamino-ethyl methacrylate and 76 percent by weight of a mixture of $C_{10-18}$ alkyl methacrylates (2.4 percent by weight N),
18.0 g of a polymeric emulsifier consisting of a copolymer prepared from 30 percent by weight of dimethylamino-ethyl methacrylate and 70 percent by weight of the same mixture of long chain methacrylate esters (3.0 percent by weight N); and of
0.0027 g of tert-butylperpivalate.

Aqueous monomer phase:
189.0 g of acrylamide;
81.0 g of methacryloxyethyl trimethylammonium chloride;
105.0 g of water;
13.5 g of adipic acid;
0.0027 g of sodium pyrosulfite; and
0.0027 g of ferrous sulfate.

Carbon dioxide was then passed through the monomer emulsion so prepared using a mixing nozzle. The emulsion was then introduced into a vertical pipe coil 4 meters in length and having an inside diameter of 0.5 cm arranged in a water bath at 40° C. The dwell time of the emulsion in the pipe was 8 minutes. The monomer emulsion then entered an externally cooled 2-liter multinecked flask equipped with stirrer, internal thermometer, and inlet pipe for gaseous carbon dioxide and was polymerized under a carbon dioxide atmosphere at an internal temperature between 40° and 50° C. At the end of the feed, the batch was heated for 2 hours to 70° C. A stable, finely divided suspension with a viscosity of 3,600 mPa.s was so obtained which upon being poured into water dissolved completely within 1 hour. The viscosity of a 1% solution in distilled water was 6,200 mPa.s.

For comparison, the following tests were run:

First comparative test

The same procedure was followed as in Example 1, except that only one polymeric emulsifier prepared from 26 percent by weight of dimethylaminoethyl methacrylate and 74 percent by weight of a mixture of long chain methacrylic esters was used. The suspension so obtained contained large amounts of bead-like polymer aggregates.

Second comparative test

The same procedure was followed as in Example 1, except that two polymeric emulsifiers were used which were prepared from monomer mixtures whose basic nitrogen contents differed by more than 1.5 percent by weight. The first emulsifier was prepared from a mixture of 24 percent by weight of dimethylaminoethyl methacrylate and 76 percent by weight of long chain methacrylic esters (2.4 percent by weight N); the second from a monomer mixture of 40 percent by weight of dimethylaminoethyl methacrylate and 60 percent by weight of long chain methacrylic esters (4.0 percent by weight N). The reaction mixture agglutinated during polymerization.

EXAMPLE 2

A polymeric emulsifier mixture was prepared as follows:

100.79 g of mineral oil and 2.12 g of tert-butyl peroctoate were heated to 80° C. under a carbon dioxide atmosphere. A mixture of 397.1 g of $C_{10}$–$C_{18}$ alkyl methacrylates, 127.0 g of dimethylaminoethyl methacrylate, and 2.12 g of tert-butyl peroctoate and, separately, a mixture of 80.62 g of mineral oil and 21.17 g of dodecyl mercaptan, were then metered in over a period of 3 hours. A mixture of 147.5 g of $C_{10}$–$C_{18}$ alkyl methacrylates, 63.2 g of dimethylaminoethyl methacrylate, and 1.1 g of tert-butyl octoate and, separately, a mixture of 40.13 g of mineral oil and 10.54 g of dodecyl mercaptan, were then metered in over a period of 1 hour. For completion of the reaction, the reactants were allowed to react further for 6 hours at 80° C. and for 2 hours at 100° C. The polymer solution so obtained contained two polymeric emulsifiers, the first of which contained 2.4 percent by weight N and the second, 3.0 percent by weight N.

A polymer suspension was then prepared by the procedure of Example 1 using the emulsifier mixture described above. A stable, finely divided polymer suspension with a viscosity of 1,500 mPa.s was so obtained which on being poured into water dissolved completely within 1 hour. The viscosity of a 1% solution in distilled water was 4,200 mPa.s. When methacrylamide was used instead of acrylamide, the resulting suspension gave a 1 percent aqueous solution having a viscosity of 3,400 mPa.s.

EXAMPLE 3

An oil phase and an aqueous monomer phase were emulsified in Example 1.
Oil phase:
184.5 g of mineral oil,
48.0 g of a polymeric emulsifier consisting of a copolymer prepared from 24 percent by weight of N-dimethylamino-ethyl methacrylamide and 76 percent by weight of a mixture of $C_{10-18}$ alkyl methacrylates (1.97 percent by weight N),
12.0 g of a polymeric emulsifier consisting of a copolymer prepared from 30 percent by weight of N-dimethylamino-ethyl methacrylamide and 70 percent by weight of a mixture of $C_{10-18}$ alkyl methacrylates (2.47 percent by weight N), and
0.12 g of tert.-butylperpivalate.
The difference between the nitrogen contents of the two monomer mixtures from which the emulsifiers had been prepared was 0.5 percent by weight.
Aqueous monomer phase:
168.0 g of acrylamide,
72.0 g of methacryloxyethyl trimethylammonium chloride,
91.5 g g of water, and
12.0 g of adipic acid.

Carbon dioxide was then passed through the emulsion so prepared for 30 to 60 minutes. Then, polymerization of the emulsified aqueous monomer phase was performed at 50° to 60° C. A stable, finely divided suspension with a viscosity of 300 mPa.s was so obtained which upon being poured into distilled water dissolved completely to give a 1% solution having a viscosity of 1600 mPa.s.

EXAMPLE 4

An oil phase was prepared from
151.5 g of mineral oil,
42.0 g of a polymeric emulsifier consisting of a copolymer prepared from 24 percent by weight of dimethylamino-ethyl methacrylate and 76 percent by weight of a mixture of $C_{10-18}$ alkyl methacrylate (2.14 percent by weight N), and
18.0 g of a polymeric emulsifier consisting of a copolymer prepared from 30 percent by weight of dimethylamino-ethyl methacrylate and 70 percent by weight of a mixture of $C_{10-18}$ alkyl methacrylates (2.67 percent by weight N).
The average nitrogen content of the mixture of both polymeric emulsifiers is 2.3 percent by weight.
An aqueous monomer phase was prepared using
189 g of acrylamide,
162 g of 50 percent by weight aqueous solution of N-trimethylammonium-propyl methacrylamide hydrochloride,
24 g of water, and
13.5 g of adipic acid.

The aqueous monomer phase was emulsified in said oil phase using a high speed agitator for 3 minutes. Nitrogen was passed through the reaction vessel for one hour to remove oxygen. Then the emulsion was heated to 40° C.–50° C. and an aqueous solution comprising 0.081 g of ammonium persulfate was added. Polymerization proceeded for 3 hours.

A stable suspension was obtained having a viscosity of 2700 mPa.s at room temperature.

The suspension readily dissolved in tap water under stirring to give a 1 percent by weight solution. The viscosity of the aqueous solution gradually increased and was
1450 mPa.s after 30 minutes,
5570 mPa.s after 60 minutes,
5800 mPa.s after 120 minutes, and
5800 mPa.s after 300 minutes.
Thus, after one hour the polymer contained in the suspension was almost completely dissolved.

Comparative test

The procedure of Example 4 was repeated but using 60 g of a single polymeric emulsifier consisting of a copolymer prepared from 26 percent by weight of dimethylaminoethyl methacrylate and 74 percent by weight of a mixture of $C_{10-18}$ alkyl methacrylates (2.3 percent by weight N) instead of the mixture of two polymeric emulsifier used in Example 4. The total amounts of polymeric emulsifiers and their total nitrogen contents agreed in both cases.

A stable suspension was obtained having a viscosity of 2800 mPa.s at room temperature. The suspension was dissolved in tap water with stirring to give a 1 percent by weight solution. The viscosity of the solution gradually increased and was
2500 mPa.s after 30 minutes,
3270 mPa.s after 60 minutes,
3270 mPa.s after 120 minutes,
3700 mPa.s after 180 minutes, and
3570 mPa.s after 300 minutes.
Although the viscosity of the aqueous solution rose faster than that of Example 4 during the first 30 minutes, maximum viscosity was reached only after 3 hours and this maximum was considerably below that of Example 4.

What is claimed is:
1. A polymer suspension comprising
(A) 15 to 60 percent, by weight of said suspension, of a continuous organic phase comprising
 (1) an organic liquid which is immiscible or not fully miscible with water, is capable of forming a continuous organic phase in said suspension, and is selected from the group consisting of aliphatic hydrocarbons, aromatic hydrocarbons, esters, and chlorinated hydrocarbons, and
 (2) 10 to 50 percent, by weight of said organic phase, of a macromolecular emulsifier soluble in said organic liquid and consisting of a mixture of two copolymers, each copolymer being formed from
  (a) 10 to 50 percent, by weight of the copolymer, of at least one mono-ethylenically unsaturated free-radically polymerizable vinyl monomer having a basic nitrogen atom and selected from the group consisting of N-vinyl pyridine, vinyl imidazole, dialkylaminoalkyl esters of acrylic acid and of methacrylic acid, and dialkylaminoalkyl amides of acrylic acid and of methacrylic acid, and (b) 90 to 50 percent, by weight of the copolymer, of at least one ester formed between a monoethylenically unsaturated mono- or dicarboxylic acid and an alkanol having 6–20 carbon atomns, or from (a) and (c) 90 to 50 percent, by weight of said copolymer, of a mixture of at least one monomer as defined in (b) with at least one vinyl monomer insoluble in water and selected from the group consisting of styrene and lower esters of acrylic and of methacrylic acid, each of said copolymers being separately prepared by the free radical solution polymerization of a different mixture of monomers (a) and (b) or (a) and (c) as defined above dissolved in the organic liquid forming the continuous phase of said suspension, said different mixtures of monomers comprising different amounts of monomer (a) having a basic nitrogen atom such that (i) the content of basic nitrogen in each of the copolymers formed from said monomer mixtures is from 1.5 to 4.0 percent by weight of basic nitrogen, but (ii) said copolymers differ in their basic nitrogen content by 0.1 to 1.5 percentage points; and (B) 85 to 40 percent, by weight of said suspension, of an aqueous phase finely divided in said organic phase and comprising (1) 10 to 50 percent, by weight of said aqueous phase, of water and (2) 90 to 50 percent, by weight of said aqueous phase of a water soluble copolymer comprising (a) 20 to 95 percent, by weight of said copolymer, of acrylamide or methacrylamide and (b) 80 to 5 percent, by weight of said copolymer, of a tertiary ammoniumalkyl ester, quaternary ammoniumalkyl ester, tertiary ammoniumalkyl amide, or quaternary ammoniumalkyl amide of acrylic acid or of methacrylic acid.

2. A polymer suspension as in claim 1 comprising from 1.8 to 3.5 percent by weight of basic nitrogen in each of the copolymers of component (A) - (2).

3. A polymer suspension as in claim 1 comprising from 2.0 to 3.2 percent by weight of basic nitrogen in each of the copolymers of component (A) - (2).

4. A polymer suspension as in claim 1 wherein said component (B)(2)(b) is a quaternary ammoniumalkyl ester or a quaternary ammoniumalkyl amide.

5. A polymer suspension as in claim 1 wherein said component (B)(2)(b) is a quaternary trialkylammoniumalkyl ester.

6. A polymer suspension as in claim 1 wherein said component (B)(2)(a) is 50 to 95 percent by weight of copolymer (B)(2) and is acrylamide.

7. A polymer suspension as in claim 1 comprising 25 to 50 percent by weight of said organic phase (A) and 75 to 50 percent by weight of aqueous phase (B).

8. A polymer suspension as in claim 1 additionally comprising (c) an acid soluble in at least one phase of said suspension and capable of converting the basic nitrogen atoms of said macromolecular emulsifier to the salt form.

9. A polymer suspension as in claim 8 wherein said acid (C) is present in an amount which is equivalent to at least one-half the basic nitrogen content of component (A)(2)(a).

10. A polymer suspension as in claim 8 wherein said acid (C) is present in an amount which is equivalent to more than the basic nitrogen content of component (A)(2)(a).

11. A polymer suspension as in claim 8 wherein said acid (C) is an organic carboxylic acid having no more than 10 carbon atoms.

* * * * *